Nov. 8, 1949 W. A. EATON 2,487,117
BRAKE MECHANISM
Filed Oct. 5, 1945 5 Sheets-Sheet 1

INVENTOR
Wilfred A. Eaton
BY
Scrivener † Parker
ATTORNEYS

Nov. 8, 1949   W. A. EATON   2,487,117
BRAKE MECHANISM
Filed Oct. 5, 1945   5 Sheets-Sheet 2
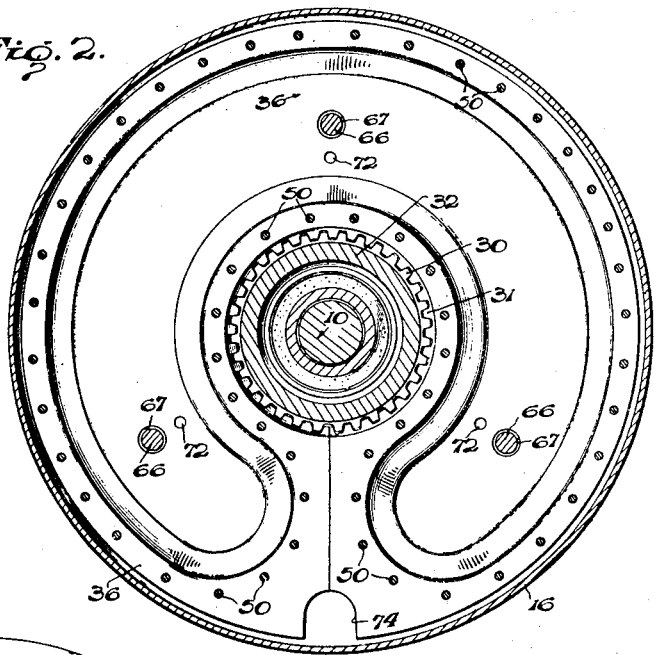
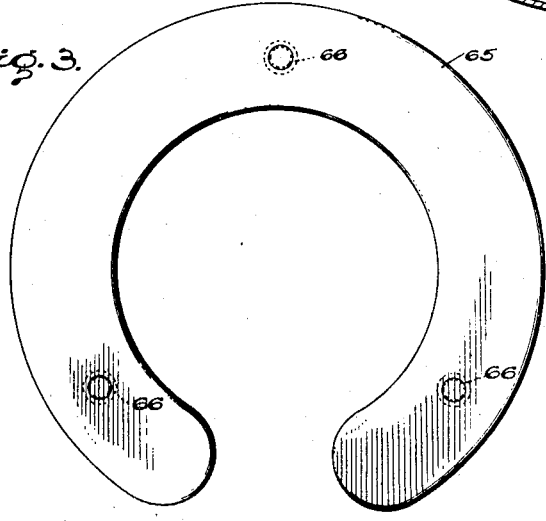
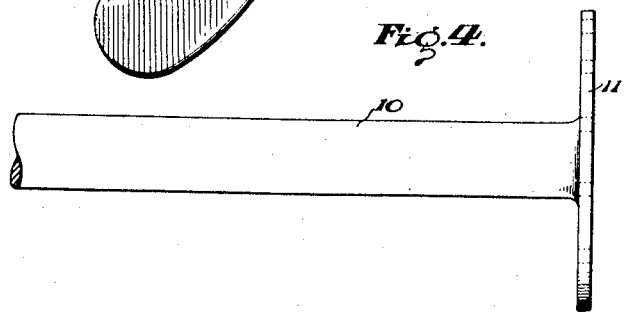
INVENTOR
Wilfred A. Eaton
BY
ATTORNEYS Nov. 8, 1949 — W. A. EATON — 2,487,117
BRAKE MECHANISM
Filed Oct. 5, 1945 — 5 Sheets-Sheet 3

INVENTOR
Wilfred A. Eaton
BY
ATTORNEYS

Nov. 8, 1949 W. A. EATON 2,487,117
BRAKE MECHANISM
Filed Oct. 5, 1945 5 Sheets-Sheet 4

INVENTOR
Wilfred A. Eaton.
BY
ATTORNEYS

Nov. 8, 1949 W. A. EATON 2,487,117
BRAKE MECHANISM
Filed Oct. 5, 1945 5 Sheets-Sheet 5

INVENTOR
Wilfred A. Eaton
BY
ATTORNEYS

Patented Nov. 8, 1949

2,487,117

UNITED STATES PATENT OFFICE 2,487,117

BRAKE MECHANISM

Wilfred A. Eaton, Oakville, Conn., assignor to Bendix-Westinghouse Automotive Air Brake Company, Elyria, Ohio, a corporation of Delaware Application October 5, 1945, Serial No. 620,593

10 Claims. (Cl. 188—152)

This invention relates to fluid pressure operated mechanism, and more particularly to fluid pressure operated brake mechanism of the disc type.

One of the objects of the present invention is to provide novel brake mechanism of the disc type, so constituted as to permit sufficient operation of the brakes without the necessity of using complicated levers or other operating linkage.

Another object of the invention is to provide brake mechanism of the above type so constituted as to permit ready accessibility to the mechanism in order to facilitate repair or replacement of various parts.

Yet another object of the invention is to provide simple and efficient means for supporting and positioning the various parts of the brake mechanism on the axle of the vehicle.

A still further object of the invention is to provide a novel and efficient fluid pressure actuator adapted for the actuation of brakes of the above type.

Another object is to provide, in an actuator of the above type, means for permitting renewal of the pressure responsive element in the actuator without requiring removal of the brake mechanism or wheel of the vehicle from the axle.

A further object of the invention is to provide, in connection with the brake mechanism of the above type, a fluid pressure actuator so constituted and arranged as to permit the application of a relatively large brake force to the braking surface, while at the same time eliminating the necessity of utilizing levers and other complicated linkage between the actuator and the brake shoes in order to multiply the mechanical advantage.

A still further object of the invention is to provide a fluid actuator for a device such as a brake, having a pressure responsive member formed as a partial annulus, in order to permit ready replacement of the member.

Other objects and novel features of the invention will appear more fully hereinafter from the following detailed description when taken in connection with the accompanying drawings, wherein two embodiments of the invention are illustrated. It is to be expressly understood, however, that the drawings are employed for the purpose of illustration only, and are not designed as a definition of the limits of the invention, reference being had to this purpose to the appended claims.

In the drawings, wherein similar reference characters refer to similar parts throughout the several views:

Fig. 2 is a sectional view of reduced size taken along line 2—2 of Fig. 1 showing the actuator push rods and actuator;

Fig. 3 is an end view in reduced size taken from the left in Fig. 1 showing the push plate and push rods of the actuator;

Fig. 4 is a full sized view of a portion of the axle shaft shown in Fig. 1;

Figure 1:
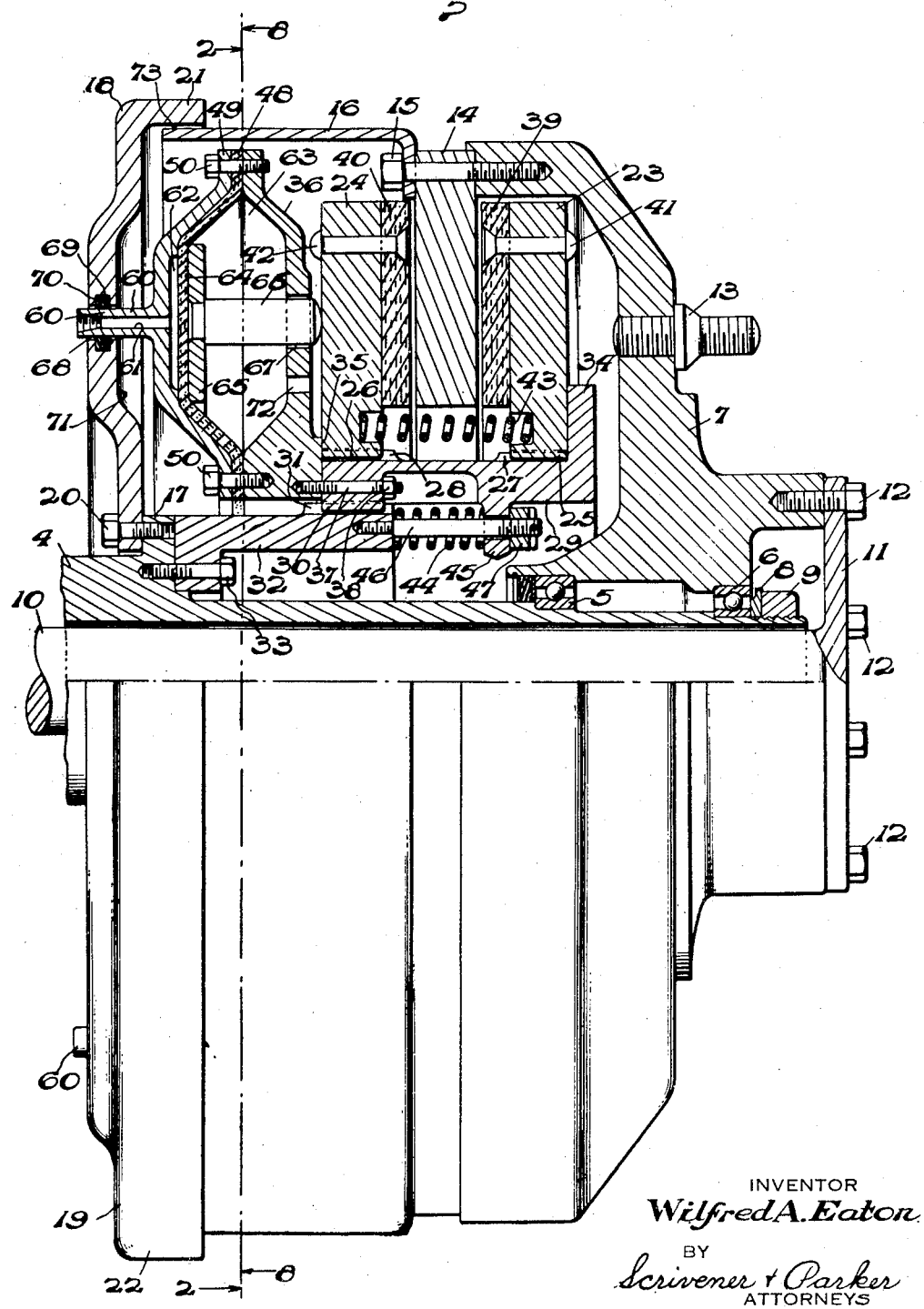
Fig. 1 is a plan view, partially in section, of a disc brake and brake actuator mechanism constructed in accordance with the principles of the present invention.
Figure 8:
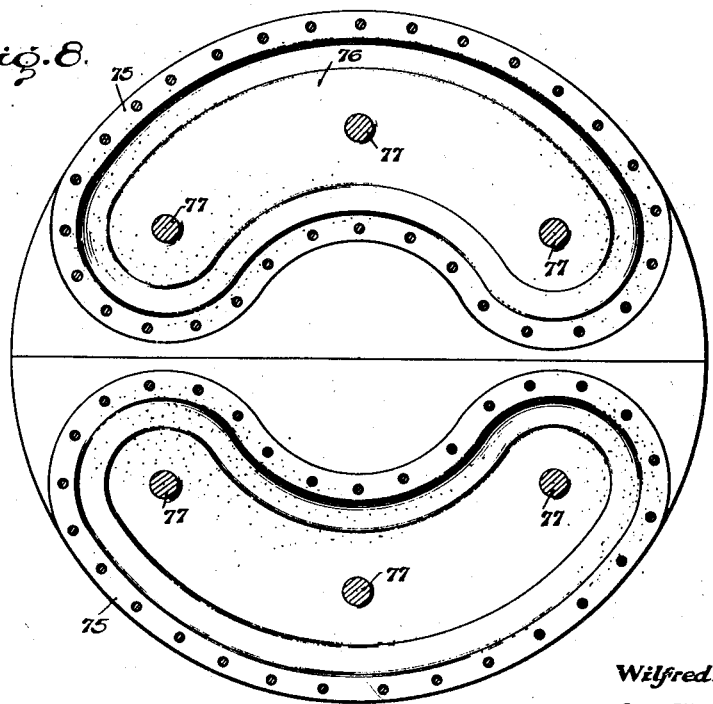
Fig. 8 shows an end view in reduced size which may be taken along line 2—2 from the right in Fig. 1 showing diaphragms and push plates of a modified form which may be used in place of similar parts shown in Figures 3 and 7.
Figure 9:
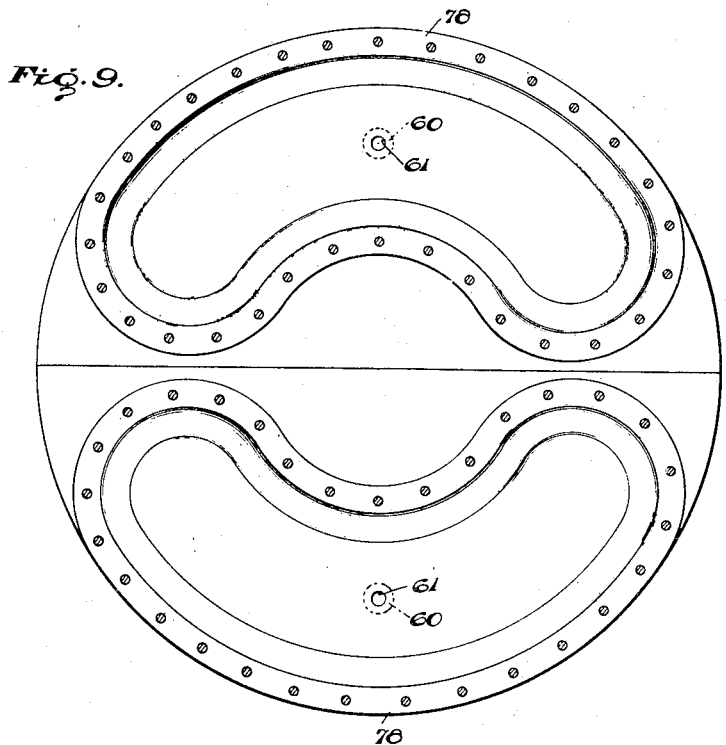
Figure 10:
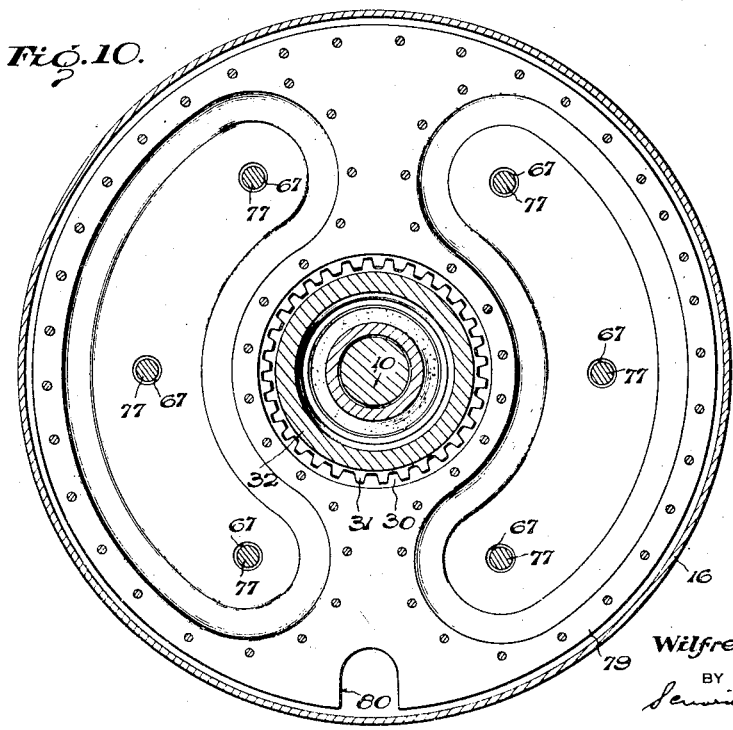

Fig. 9 is an end view in reduced size of a pressure plate for the actuator adapted to be used in connection with the diaphragms shown in Fig. 8, and Fig. 10 is a view in reduced size of a modified non-pressure plate taken from the left along line 2—2 in Fig. 1, and showing a non-pressure plate adapted to be used in connection with the modified diaphragms shown in Fig. 8 and the modified pressure plates shown in Fig. 9.

Figure 6:
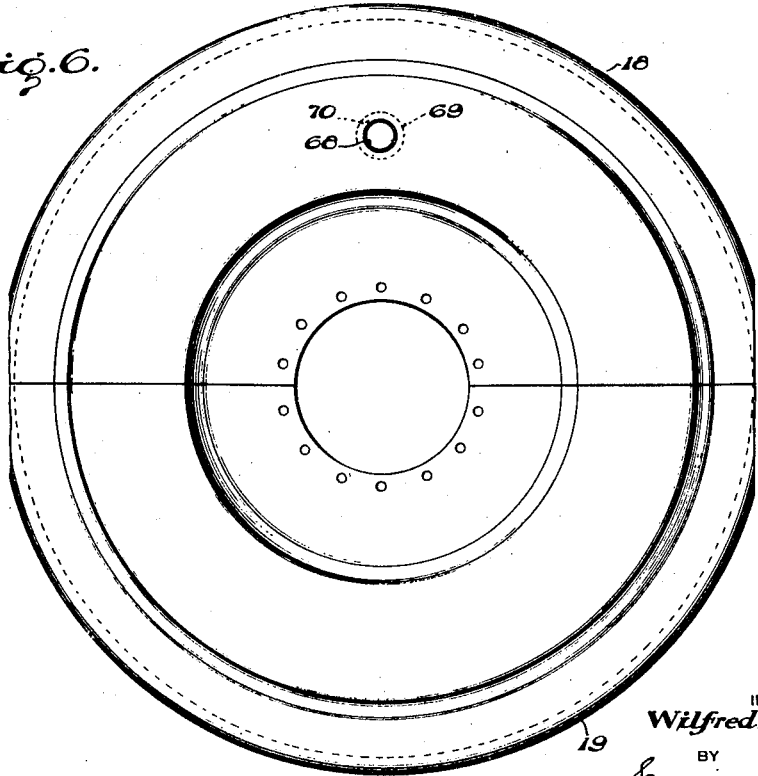
Fig. 6 is an end view in reduced size taken from the left in Fig. 1, showing the dust shields covering the left end of the brake mechanism.

Referring more particularly to Fig. 1, an axle or axle housing 4 of the non-rotating type is provided with ball bearings 5 and 6, and a wheel hub 7 is rotatably mounted thereon and maintained in the position shown by means of a washer 8 and a nut 9 threadedly received on the right end of the axle 4. Although the construction shown may be readily adapted to either the front or rear wheel brakes of a vehicle, the present construction is intended for the rear axle of a vehicle, and to this end, a driven shaft or axle shaft 10 is provided, extending through the center of the axle, and provided at its right end with a driving flange 11 attached to the right end of the hub 7 by means of suitable cap screws 12, it thus being apparent that when the shaft 10 is rotated by the engine of the vehicle, the wheel hub 7 will likewise be rotated thereby, suitable studs 13 being provided on the hub in order to carry wheels of any conventional type. A brake disc 14, preferably in the form of a flat annular ring, is attached to the wheel hub for rotation therewith by means of suitable cap screws 15 as shown, a drum-shaped shield 16 likewise being attached to the brake disc for rotation therewith by means of the above cap screws. Flange 17 is provided on the axle as shown, and a pair of dust shields 18 and 19, which are split along a horizontal center line and indicated in Fig. 6, are attached to the left surface of the flange by means of cap screws 20, it thus being possible to remove the dust shields entirely from the axle for access to the brake mechanism, without removing any portion of the brake mechanism from the axle. The dust shields are also provided with flanged portions 21 and 22 which extend over the outside of the shield 16 in order to minimize the entrance of dirt into the interior of the brake mechanism.

In order to provide a brake action of the ring 14, a pair of annular ring type brake shoes 23 and 24 are provided with internal splines 25 and 26, the spline portions of these brake shoes being slidably mounted on similar external splines 27 and 28 formed on the outer surface of an annular brake shoe supporting ring 29. The supporting ring is likewise provided at its left end with internal splines 30 and the ring is mounted with these splines in sliding engagement with cooperating external splines 31 formed on an annular mounting ring 32 rigidly attached to the axle 4 by means of cap screws 33 as shown. A flange 34 is formed at the right end of the ring 29, and is thus effective to prevent movement of the brake shoe 23 to the right from the position shown. In like manner, movement of the brake shoe 24 to the left from the position shown is prevented by means of a flange 35 formed on an annular non-pressure plate 36 attached to the left end of the ring 29 by means of studs 37 and nuts 38. Brake lining members 39 and 40, which may be in the form of annular rings or portions of annular rings, are mounted on the brake shoes 23 and 24 by means of rivets 41 and 42 respectively, and with the parts in the position shown, a slight clearance is permitted between the inner surface of the brake lining members and the outer surfaces of the brake ring 14, the brake shoes being maintained in the position shown by a plurality of springs 43 interposed therebetween. In order that the assembly comprising the ring 29, the brake shoes 23 and 24, and the non-pressure plate 36 may be maintained normally in the position shown in order to provide substantially the same clearance between each of the brake lining members and the brake disc 14, the ring 29 is urged to the right by means of a spring 44 interposed between the right end of the ring 32 and a lug 45 formed on the ring 29, and movement of the ring 29 to the right with respect to the ring 32 is limited by means of studs 46 threadedly received by the ring 32 and provided on their right ends with nuts 47 threadedly received by the studs. Thus by adjusting the position of the nuts 47 on the studs, the entire assembly above described may be moved to the right or left with respect to the brake disc 14. In addition to the foregoing, the springs 43 act to prevent engagement between the brake lining and the brake disc except when the brakes are applied.

Figure 5:
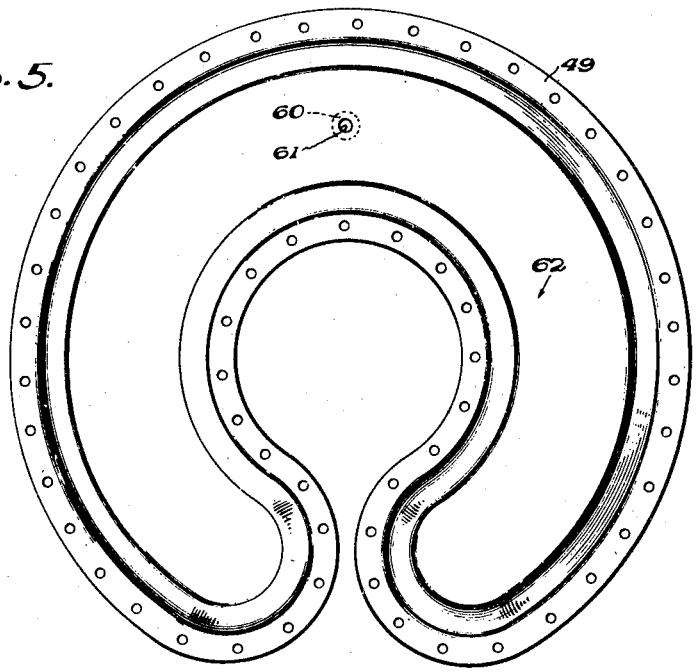
Fig. 5 is an end view in reduced size taken from the right in Fig. 1 showing the pressure plate of the actuator.
Figure 7:
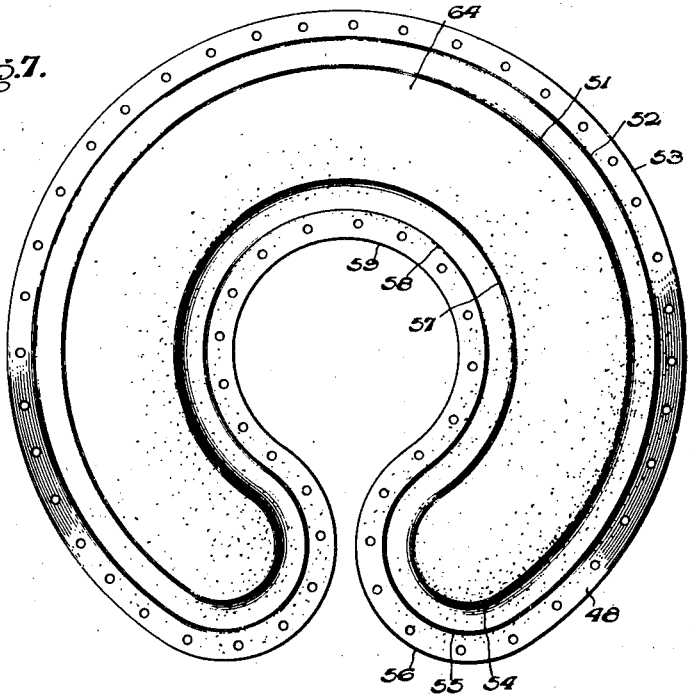
Fig. 7 is an end view in reduced size taken from the right in Fig. 1 showing the flexible diaphragm of the actuator.

Various types of disc brakes for operation by fluid pressure actuators have previously been proposed, but in many cases it has been necessary to provide complicated leverage or linkage for connecting the brake shoes and actuators in order to insure the transmission of sufficient force to the brake shoes to effect a satisfactory braking operation. In order to overcome this difficulty, the present invention contemplates the use of a fluid pressure actuator having a pressure responsive member or pressure responsive members of relatively large effective area, having operative connections with the brake shoes so constituted that the braking force exerted by the actuator or actuators is double that which would normally be exerted by an actuator or actuators having pressure responsive members of the same effective areas. In the embodiment shown in Fig. 1, the pressure responsive member is illustrated as being in the form of a flexible diaphragm 48 retained in position against the left face of the non-pressure plate 36 by means of a pressure plate 49 and suitable cap screws 50 threadedly received by the non-pressure plate. The major portion of the diaphragm is preferably in the form of a partial annular ring having a cross section shaped as shown in Fig. 1, but in order to permit ready removal of the diaphragm from the actuator without removing the entire brake mechanism from the right end of the axle in order to permit removal of a continuous annular pressure responsive member of this shape over the right hand of the axle, the ends of the member are formed as shown more fully in Fig. 7, the circular lines 51, 52 and 53, defining the main portion of the diaphragm in that figure merging tangentially with arcuate portions 54, 55 and 56 at either end of the diaphragm, the latter portions likewise merging tangentially with the lines 57, 58 and 59. The pressure plate 49, shown in more detail in Fig. 5, is likewise shaped to conform with the shape of the diaphragm as shown in Figures 1 and 7, and is provided with an inlet boss 60 having an inlet port 61 formed therein. Thus the diaphragm divides the casing formed by the non-pressure plate 36 and the pressure plate 49 into an inlet chamber 62 at the left of the diaphragm, and an atmospheric chamber 63 at the right of the diaphragm, and when fluid pressure is supplied to the passage 61, the diaphragm or pressure responsive member, as shown in Fig. 1, is moved to the right.

As indicated in Figs. 7 and 1, the lines 51, 54 and 57 define a depressed flat portion 64 of the diaphragm, and in order to impart force to the brake shoes to insure engagement thereof with the brake ring 14 on application of fluid pressure to the chamber 62 of the actuator, a push plate 65, shaped to conform to the shape of the flat portion, and shown in Figures 3 and 1, is positioned in the interior of the actuator against the flat portion of the diaphragm, and provided preferably with 3 push rods 66, which may be spaced 120° apart as indicated in Fig. 3, these push rods being slidably mounted in bores 67 formed in the pressure plate 36. The right ends of the several push rods are in engagement with the left surface of the brake shoe 24, and it will be understood that since 3 push rods are used, and since these may be loosely mounted in the bores 67, the entire push plate and push rod assembly may rock slightly in order to conform to inequalities of the diaphragm and to inequalities of the surface of the brake shoe 24 or brake lining member 40 in order to insure that each of the push rods will be effective to impart evenly distributed forces to the brake shoe 24. Thus when fluid pressure is supplied to the brake chamber 62 through the port 61, the diaphragm and the non-pressure plate 49 will be forced in opposite directions, the push rods 66 thus moving the brake shoe 24 and the brake lining 40 to the right against the left surface of the ring 14, and the movement of the pressure plate 49 to the left serving to move the brake shoe 23 and the brake lining 39 against the right surface of the brake ring 14 by virtue of the fact that force is imparted from the pressure plate 49 to the brake shoe 23 through the cap screws 50, the non-pressure plate 36, the studs 37, the annular ring 29 and the flange 34 formed thereon. The force exerted on each brake shoe to force it against the brake ring is equal to that exerted by the pressure responsive member 48, and the total braking force exerted on the ring 14 is therefore twice that exerted by the pressure responsive member. As heretofore stated, protection of the brake mechanism from dirt and water is afforded by the shield 16 and the dust shields 18 and 19. In order to permit the connection of a suitable air supply line to the passage 61, the boss 60 is preferably of cylindrical form, and extends to the left through a bore 68 formed in the upper dust shield, an annular groove 69 serving to retain a resilient sealing ring 70 in sliding engagement with the outer surface of the boss in order to prevent entrance of water or dirt into the brake mechanism at this point. An annular depression 71, formed in the dust shield 18, and coextensive with a similar depression formed in the dust shield 19, provides clearance for movement of the pressure plate 49 to the left when fluid pressure is supplied to the chamber 62. In order to insure against the compression of fluid pressure in the chamber 63 on movement of the pressure responsive member to the right, an exhaust port 72 is provided as shown in the right wall of the non-pressure plate 36, it being noted that the space to the right of this port is in communication with atmosphere through an annular passage 73 formed between the shield 16 and the dust shields 18 and 19.

Although other forms of pressure responsive members may be used having similar shapes in a mechanism of this kind, it will be understood that due to wear, these members may require replacement before replacement is required of the brake lining 39 and 40. If it is desired to replace the diaphragm, for example, the dust shields 18 and 19 are removed by removing the cap screws 20, and on subsequent removal of the cap screws 50 the pressure plate 49 may be moved to the left along the axle housing, and the diaphragm may then be readily removed and replaced with a new one without requiring the removal of any other part of brake mechanism. In like manner, in the event a pressure responsive member of a more rigid type is used, the gap between the ends of the pressure responsive member may be so proportioned as to permit the member to be removed over the axle housing without requiring distortion of the member or removal of the rest of the brake mechanism from the axle.

In the event it is necessary to apply new lining to the brake shoes, the hub 7 is first disconnected from the brake disc 14 by removing the cap screws 15, and in order to permit such removal, a notch 74 is cut in the lower portion of the pressure plate 36, see Fig. 2, and each of the cap screws may be loosened and removed through this opening by revolving the hub in order to permit successive alignment of the cap screws with the opening and their removal therethrough. When this has been done, the axle shaft 10 is withdrawn from the casing by removing the cap screws 12, and the wheel hub 7 is removed from the right end of the casing after removal of the nut 9 and the retaining washer 8. When this has been accomplished, it is only necessary to remove the nuts 47, whereupon the entire assembly comprising the ring 29, the brake shoes 23 and 24, brake ring 14, the non-pressure plate 36, the diaphragm 48, and the pressure plate 49, may be removed entirely from the axle by sliding the assembly to the right along the splines 31. When the above assembly has been removed, removal of the nuts 38 will permit separation of the non-pressure plate 36 from the annular ring 29, whereupon the entire brake shoe mechanism may be readily assembled by moving the parts to the left along the ring 29. The parts are reassembled in the reverse manner, and the nuts 47 again adjusted to properly position the brake shoes and the brake lining with respect to the opposite surfaces of the ring 14.

It is also contemplated that on certain types of axles, it may be desirable to provide an actuator having two or more pressure responsive members of similar shape in place of the single member, and such a modification is illustrated more fully in Figures 8, 9 and 10. In the particular embodiment shown, two kidney-shaped pressure responsive members 75 as illustrated in Fig. 8 are used, and a pair of similarly shaped push plates 76, each provided with three push rods 77 are provided, the cross section of the members being the same as that of the diaphragm shown in Fig. 1. Pressure plates 78, modified as shown in Fig. 9, are also provided, each being provided with a boss 60 having a fluid pressure passage 61, an additional bore, not shown, and oppositely positioned from the bore 68 in the dust shield 18, being provided in a corresponding position in the dust shield 19 in order to permit passage of fluid to the lower of the pressure plates 78. As indicated in Fig. 10, a non-pressure plate 79 similar to pressure plate 76 is likewise modified to conform to the shape of the pressure plate 78 and the diaphragm 75, and in this case, an opening or notch 80 is provided at the right side of the pressure plate as viewed in Fig. 10, in order to permit removal of the cap screws 15 during disassembly of the brake mechanism. In the event this construction is used, the passage 61, and the corresponding passage in the boss of the lower pressure plate 78 are both connected to the source of fluid pressure utilized to control the operation of the brakes. The diaphragms 75 are again clamped between the non-pressure plate and the pressure plates by means of cap screws 50, and in the event it is desired to replace the members 75, this can readily be done by removing the cap screws 50 and the pressure plates 78 after removal of the dust shields 18 and 19. In the event non-flexible pressure responsive members are substituted for the diaphragms 75, and are mounted for movement in the casing formed by the non-pressure plate 36 and the pressure plates 78, it will be further understood by those skilled in the art that the construction illustrated and described is such as to permit the ready removal and renewal of these pressure responsive members without the necessity of dismantling any other portion of the brake mechanism. In either of the constructions shown, the push rods connected to the push plates are so positioned and arranged as to permit an even distribution of force from the pressure responsive members to the brake shoes, compensating for any slight inequalities which may exist in the dimensioning of parts, and particularly in the length of the various push rods. The actuator is so constructed as to permit substantially all of the brake lining to be worn out before the maximum stroke of the push rods is reached, and it is thus unnecessary to remove the wheel hub and the brake shoes from the axle until this has occurred.

While two embodiments of the invention have been illustrated and described in considerable detail, it is to be understood that the same is not limited thereto but may be embodied in various forms as will be well understood by those skilled in the art. It will be furthermore understood that certain parts may be used without others if desired, without departing from the spirit of the invention. Reference will, therefore, be had to the appended claims for the limits of the invention.

What is claimed is:

1. Brake mechanism of the disc type including an axle, a wheel rotatably mounted thereon, an annular brake disc mounted on the wheel, an annular brake supporting ring mounted on the axle, an annular brake shoe supporting ring slidably and non-rotatably mounted on the first named ring, a pair of annular disc brake shoes non-rotatably mounted on said brake shoe supporting ring disposed one on either side of said annular brake disc and adapted to engage the latter, means carried by said brake shoe supporting ring for engaging one of said brake shoes and for moving the latter in one direction on axial movement of said brake shoe supporting ring in the same direction on said brake supporting ring, and means for effecting axial movement of said brake shoe supporting ring in said one direction and axial movement of the other of said brake shoes in the opposite direction thereon to engage the brake shoes with the brake disc including a power actuator having a pair of relatively movable members, means for connecting one of said members with said brake shoe supporting ring, and an operative connection between the other of said relatively movable members and the other of said brake shoes.

2. Brake mechanism of the disc type including an axle, a wheel rotatably mounted thereon, an annular brake disc mounted on the wheel, an annular brake supporting ring mounted on the axle, an annular brake shoe supporting ring slidably and non-rotatably mounted on the first named ring, a pair of annular disc brake shoes non-rotatably mounted on said brake shoe supporting ring disposed one on either side of said annular brake disc and adapted to engage the latter, means carried by said brake shoe supporting ring for engaging one of said brake shoes and for moving the latter in one direction on axial movement of said brake shoe supporting ring in the same direction on said brake supporting ring, means for effecting axial movement of said brake shoe supporting ring in said one direction and axial movement of the other of said brake shoes in the opposite direction thereon to engage the brake shoes with the brake disc including a power actuator having a pair of relatively movable members, means for connecting one of said members with said brake shoe supporting ring, and an operative connection between the other of said relatively movable members and the other of said brake shoes, resilient means for opposing the movement of said brake shoe supporting ring in said one direction, and means for limiting the degree of movement of the brake shoe supporting ring in the other direction by the action of said resilient means.

3. Brake mechanism of the disc type including an axle, a wheel rotatably mounted thereon, an annular brake disc mounted on the wheel, an annular brake supporting ring mounted on the axle, an annular brake shoe supporting ring slidably and non-rotatably mounted on the first named ring, a pair of annular disc brake shoes non-rotatably mounted on said brake shoe supporting ring disposed one on either side of said annular brake disc and adapted to engage the latter, means carried by said brake shoe supporting ring for engaging one of said brake shoes and for moving the latter in one direction on axial movement of said brake shoe supporting ring in the same direction on said brake supporting ring, means for effecting axial movement of said brake shoe supporting ring in said one direction and axial movement of the other of said brake shoes in the opposite direction thereon to engage the brake shoes with the brake disc including a power actuator having a pair of relatively movable members, means for connecting one of said members with said brake shoe supporting ring, and an operative connection between the other of said relatively movable members and the other of said brake shoes, and means for normally positioning said brake shoes in spaced relationship with said brake disc including resilient means interposed between said brake shoes for urging them in opposite directions on said annular brake shoe supporting ring, a stop for limiting the degree of axial movement of said brake shoe supporting ring in one direction on said brake supporting ring, and other resilient means for normally maintaining said brake shoe supporting ring in engagement with said stop.

4. Brake mechanism of the disc type including an axle, a wheel rotatably mounted thereon, an annular brake disc mounted on the wheel, an annular brake supporting ring mounted on the axle, an annular brake shoe supporting ring slidably and non-rotatably mounted on the first named ring, a pair of annular disc brake shoes non-rotatably mounted on said brake shoe supporting ring disposed one on either side of said annular brake disc and adapted to engage the latter, means carried by said brake shoe supporting ring for engaging one of said brake shoes and for moving the latter in one direction on axial movement of said brake shoe supporting ring in the same direction on said brake supporting ring, means for effecting axial movement of said brake shoe supporting ring in said one direction and axial movement of the other of said brake shoes in the opposite direction thereon to engage the brake shoes with the brake disc including a power actuator having a pair of relatively movable members, means for connecting one of said members with said brake shoe supporting ring, and an operative connection between the other of said relatively movable members and the other of said brake shoes, and means for normally positioning said brake shoes in spaced relationship with said brake disc including resilient means interposed between said brake shoes for urging them in opposite directions on said annular brake shoe supporting ring, an adjustable stop for limiting the degree of axial movement of said brake shoe supporting ring in one direction on said brake supporting ring, and other resilient means for normally maintaining said brake shoe supporting ring in engagement with said stop.

5. Brake mechanism of the disc type including an axle, a wheel rotatably mounted thereon, an annular brake disc mounted on the wheel, an annular brake supporting ring mounted on the axle, an annular brake shoe supporting ring slidably and non-rotatably mounted on the first named ring, a pair of annular disc brake shoes non-rotatably mounted on said brake shoe supporting ring disposed one on either side of said annular brake disc and adapted to engage the latter, means carried by said brake shoe supporting ring for engaging one of said brake shoes and for moving the latter in one direction on axial movement of said brake shoe supporting ring in the same direction on said brake supporting ring, and means for effecting axial movement of said brake shoe supporting ring in said one direction and axial movement of the other of said brake shoes in the opposite direction to effect engagement of said brake shoes with said brake disc including a fluid pressure actuator having a casing member and a pressure responsive member mounted therein for movement relative to the casing, means for connecting one of said members with said brake shoe supporting ring, and an operative connection between the other of said members and the other of said brake shoes.

6. Brake mechanism of the disc type including an axle, a wheel rotatably mounted thereon, a brake disc mounted on said wheel, a pair of brake shoes supported on said axle and positioned on opposite sides of said brake disc, and means for effecting engagement of said shoes with said brake disc including a fluid actuator having an annular shaped casing member mounted substantially concentric with the axle and movable axially with respect thereto, an open ended ring-like pressure responsive member mounted in the casing for movement relative thereto, the ends of said pressure responsive member being spaced to permit removal thereof over said axle, means for supplying fluid pressure to said casing, and operative connections between said members and brake shoes.

7. Brake mechanism of the disc type including an axle, a wheel rotatably mounted thereon, a brake disc mounted on said wheel, a pair of brake shoes supported on said axle and positioned on opposite sides of said brake disc, and means for effecting engagement of said shoes with said brake disc including a fluid actuator having an annular shaped casing member mounted substantially concentric with the axle and movable axially with respect thereto, an open ended ring-like pressure responsive member mounted in the casing for movement therein, means for supplying fluid pressure to said casing, a connection between said casing and one of said brake shoes, and a plurality of operative connections between said pressure responsive member and the other of said brake shoes.

8. Brake mechanism of the disc type including an axle, a wheel rotatably mounted thereon, a brake disc mounted on said wheel, a pair of brake shoes supported on said axle and positioned on opposite sides of said brake disc, and means for effecting engagement of said shoes with said brake disc including a fluid actuator having an annular shaped casing mounted substantially concentric with the axle and movable axially with respect thereto, an open ended ring-like pressure responsive member mounted for movement in the casing, means for supplying fluid pressure to the casing, a connection between the casing and one of said brake shoes, and three spaced operative connections between said pressure responsive member and the other of said brake shoes.

9. Brake mechanism of the disc type including an axle, a wheel rotatably mounted thereon, a brake disc mounted on said wheel, a pair of brake shoes supported on said axle and positioned on opposite sides of said brake disc, and means for effecting engagement of said shoes with said brake disc including a fluid actuator having an annular shaped casing mounted substantially concentric with the axle and movable axially with respect thereto, a ring-like open ended flexible diaphragm mounted in the casing, means for supplying fluid pressure to the casing, a connection between the casing and one of said brake shoes, and an operative connection between the diaphragm and the other of said brake shoes.

10. Brake mechanism of the disc type including an axle, a wheel rotatably mounted thereon, a brake disc mounted on said wheel, a pair of brake shoes supported on said axle and positioned on opposite sides of said brake disc, and means for effecting engagement of said brake shoes with said brake disc including a fluid actuator having an annular shaped casing mounted substantially concentric with the axle, a ring-like open ended flexible diaphragm mounted in the casing, a ring-like open ended push plate mounted in the casing and adapted to engage one side of the diaphragm, means for connecting the casing with one of said brake shoes, and connecting means between the push plate and the other of said brake shoes.

WILFRED A. EATON.

REFERENCES CITED

The following references are of record in the file of this patent:

UNITED STATES PATENTS

| Number | Name | Date |
|---|---|---|
| 2,000,542 | Wasson | May 7, 1935 |
| 2,061,905 | Hewitt | Nov. 24, 1936 |
| 2,166,165 | Linderman | July 18, 1939 |
| 2,289,549 | Norstrom | July 14, 1942 |
| 2,359,516 | Frank | Oct. 3, 1944 |
| 2,379,972 | Lambert | July 10, 1945 |
| 2,381,166 | Halbarth | Aug. 7, 1945 |
| 2,392,970 | Bricker | Jan. 15, 1946 |